Jan. 16, 1934.  K. F. JACOBSEN  1,943,675
AUXILIARY CUTTER FOR POWER DRIVEN LAWN MOWERS
Filed Jan. 26, 1929  2 Sheets-Sheet 1

Inventor
Knud F. Jacobsen

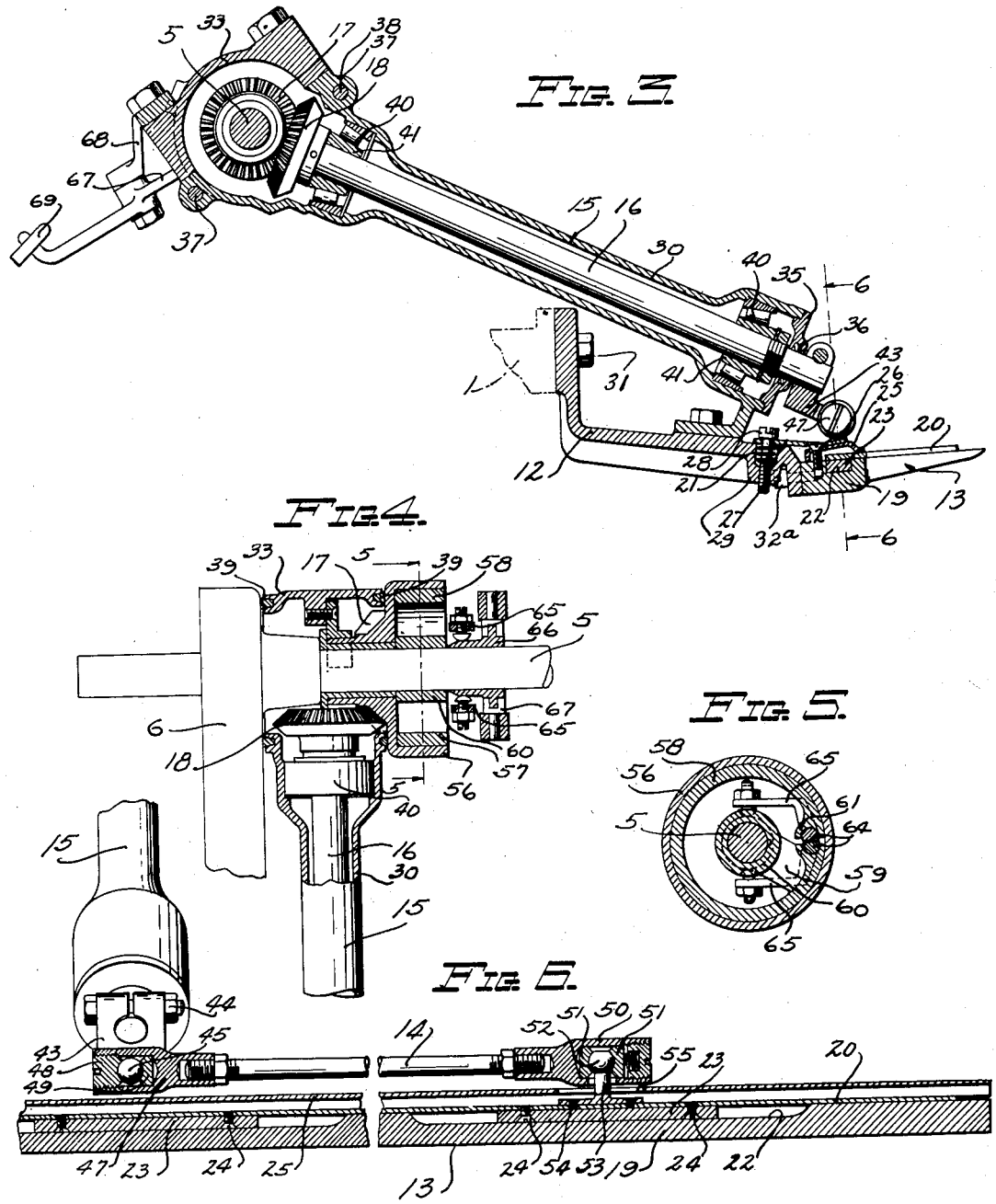

Patented Jan. 16, 1934

1,943,675

UNITED STATES PATENT OFFICE 1,943,675

AUXILIARY CUTTER FOR POWER DRIVEN LAWN MOWERS

Knud F. Jacobsen, Racine, Wis., assignor to Jacobsen Manufacturing Co., Racine, Wis., a corporation of Wisconsin Application January 26, 1929. Serial No. 335,347

7 Claims. (Cl. 56—238)

This invention relates to lawn mowers and more particularly to an attachment for lawn mowers whereby two separate cutting operations may be performed upon grass or the like each time the mower is moved thereover.

One defect in lawn mowers of the rotary blade or reel type, results from the inability of the mower to cut long stemmed grass, weeds, etc., such tall growths being bent over or knocked down by the cutting reel without being brought between the blade and the ledger plate thereby. Thus if an attempt is made to cut tall grass the mower only partly performs its function and leaves the lawn in an untidy appearance. Tall grass also clogs the driving means for the cutting reel and impairs rapid cutting of the lawn. The field of utility of this type of mower is thus more or less limited to the cutting of relatively short grass. The same results occur to a lesser degree when the grass is relatively short except for certain growths, such as weeds which have grown up to a height approximately equal to the distance of the reel axis above the ground, these tall weeds or the like remaining uncut by the mower.

An object of the present invention is to overcome these and other difficulties encountered in this type of mower by providing for the cutting of two swaths, one above the other, the first being at the proper level to cut the tall grass to a level low enough to permit the second to reduce all of the grass to the same height so as to leave the lawn in a neat and smooth condition after having been gone over only once by the mower.

Another object is to provide a novel attachment adapted to be used with a known type of revolving blade mower, the attachment being adapted to cut relatively tall grass.

In carrying out these and other objects, one embodiment of the invention contemplates the mounting of an auxiliary cutter of the reciprocating or sickle type on the frame of a known type of power driven lawn mower and in the provision of means for establishing a driving connection between the engine of the mower and the auxiliary cutter. In this arrangement the auxiliary cutter is preferably mounted above the cutting plane of the reel so that the load on the auxiliary cutter is not excessively high and yet the height of the grass being cut is reduced to a level suitable for proper cutting by the reel.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 3 is a vertical cross-sectional view of the sickle and of the means for driving the same;

Figure 4 is a fragmentary view partly in cross-section of a housing and the clutch and gear arrangement used in operatively connecting the sickle to a shaft driven by the engine on the mower;

Figure 5 is a cross-sectional view on the line 5—5 of Figure 4; and

Figure 6 is a front view partly in cross-section and partly broken away to show the arrangement of the pitman and the guiding means for the sickle plate of the auxiliary cutter.

Figure 1:
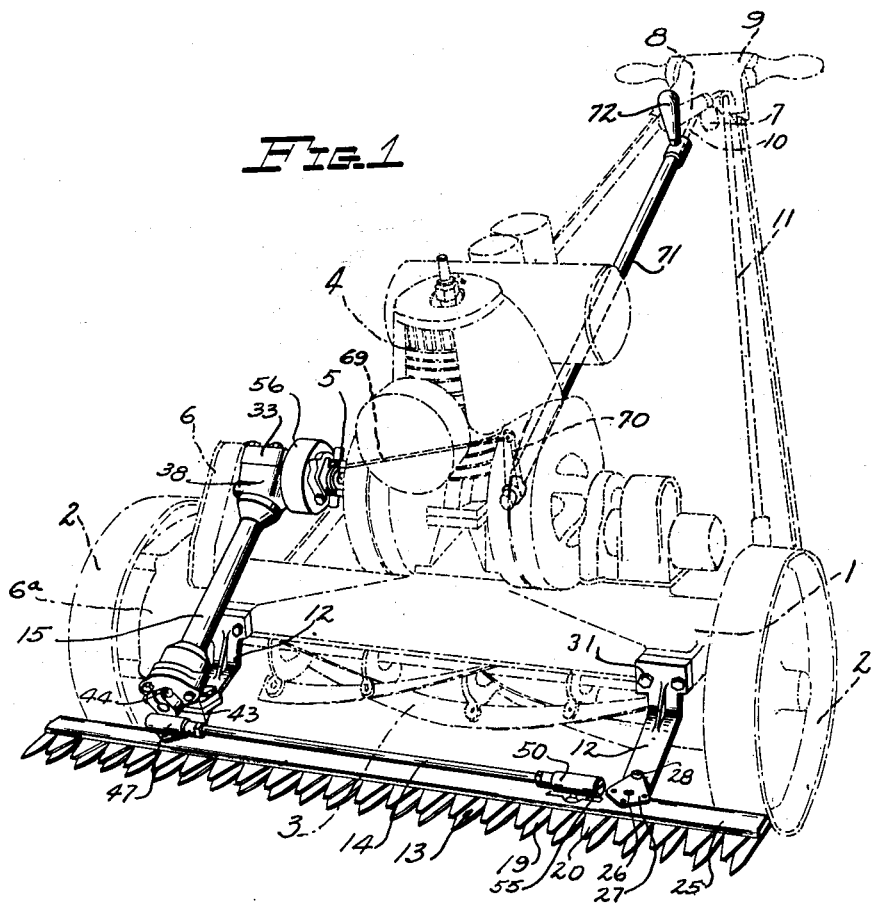
Figure 1 is a perspective view of an attachment embodying the principles of the invention as applied to a known form of power driven lawn mower, the mower being shown in dotted lines.

Referring to Figure 1 an improved attachment embodying one form of the invention is shown mounted on a power driven lawn mower of the revolvable blade or reel type. The mower may be of any suitable construction, the one shown in dotted lines in Figure 1 having a frame 1 provided with a pair of spaced traction wheels 2 and a cutting reel 3 adapted to be driven by an internal combustion engine 4 mounted on the upper portion of the frame. The engine is adapted to drive the traction wheels 2 and the cutting reel 3 through a shaft 5, a gear train and suitable clutches (not shown) in the gear box 6 and a differential gear arrangement in the gear box 6ª. The clutch for the traction wheels is controlled by a hand operated control lever 7 mounted adjacent the handle 9 of the mower on a shaft 10. The clutch for the cutting reel is controlled by axial movement of the reel which is in turn controlled by a hand lever 8 on a shaft 11.

The attachment shown includes brackets 12 adapted to be mounted on the frame 1 of the mower, a sickle 13 adapted to be mounted on the brackets in advance of and slightly above the cutting reel of the mower, a pitman 14 for driving the sickle, a housing 15 with a shaft 16 and bevel gears 17 and 18 therein for driving the pitman 14 and clutch mechanism for operatively connecting and disconnecting the bevel gear 17 to the motor driven shaft 5 of the mower.

The supporting brackets 12 are preferably two in number and are secured to the frame of the mower by bolts 31 so as to project forwardly therefrom. As shown in Figure 3, the projecting ends of the brackets are secured to the sickle bar 19 by screws 32ª. The sickle bar 19 is thus rigidly supported on the frame 1.

Figure 2:
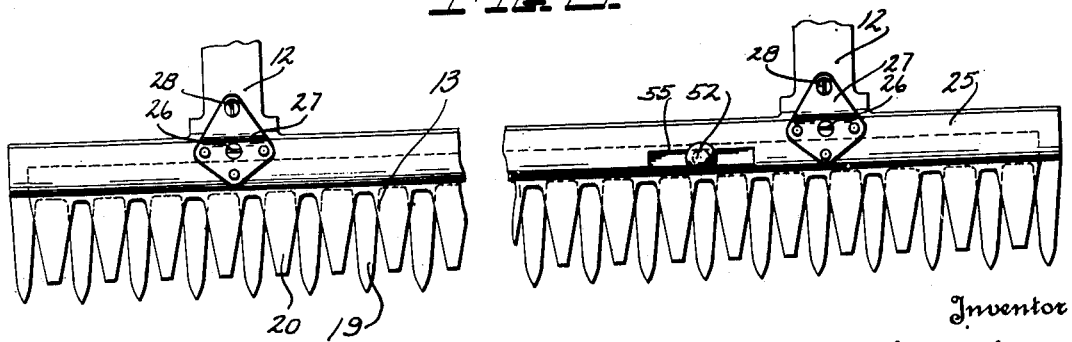
Figure 2 is a broken plan view of the sickle used in the attachment of Figure 1.

As shown in Figures 1 to 3, the sickle includes a reciprocating sickle blade 20 having knife portions thereon for cooperating with the teeth of the sickle bar 19 to cut grass in the usual manner when the sickle blade is actuated. The blade 20 is preferably somewhat shorter than the sickle bar so that it does not project beyond either end thereof when operated.

As shown in Figures 3 and 5 guiding means is provided for constraining the sickle blade to move in a straight line parallel to the longitudinal axis thereof. For this purpose the sickle bar is provided with grooves 22 adjacent each end thereof and which extend longitudinally in the direction of motion of the sickle blade. The sickle blade is provided with depending blocks 23 which extend into the grooves 22 in the sickle bar and which are of approximately the same width as the grooves. These blocks 23 may be secured to the sickle blade by any suitable means such as screws 24.

Means is also provided for maintaining the proper normal pressure between the blade and bar. This means comprises a resilient channel plate 25 which extends the entire length of the sickle bar and which is held in position by means of clamping screws 26 as shown in Figure 3. The clamping screws 26 are just to the rear of the sickle blade so as not to interfere with movement of the blade. The forward end of the resilient plate 25 rests upon the sickle blade 20 while the rear end rests upon the sickle bar 19. The plate is also held in position by lugs 27 which are riveted to the plate and which extend rearwardly therefrom. The rear ends of the lugs 27 are provided with holes for receiving screws 28 threaded in depending bosses 29 on the brackets 12. A coil spring 21 is placed between each lug 27 and the correspondingly positioned boss 29 so as to provide a yieldable and adjustable connection between the plate 25 and the brackets 12. With this construction it will be seen that the resilient plate 25 is adapted for pivotal movement about its rear edge and may be adjusted to exert the required normal or vertical pressure upon the blade 20 by turning the screws and the bolts 28. The action of the screws 26, springs 21 and bolts 28 is such that they cooperate in regulating the position of the resilient plate with respect to the sickle bar 19.

As shown in Figure 3 the housing 15 mentioned above is preferably of a three part construction, comprising a tubular portion 30 which houses a shaft 16 and a bevel gear 18, an upper cap 33 which cooperates with the portion 30 to house a second bevel gear 17 and a portion of the shaft 5 of the mower and a lower end cap 35 which is provided with a bearing 36 for supporting the lower end of the shaft 16 which extends therethrough. The three parts of the housing are bolted together as shown and may be secured to the frame of the mower by bolts 37 which pass through the main transmission housing 6 of the mower and engage threaded bosses 38 on opposite sides of the tubular portion 30. Felt washers 39 (Figure 4) may be provided on opposite sides of the upper end of the housing 15 to prevent the escape of oil or grease therefrom. Suitable roller thrust bearings 40 are positioned in opposite ends of the portion 30 of the housing for cooperating with cone-shaped collars 41 on the shaft 16 to hold the shaft in position.

The lower end of the shaft 16 has a crank arm 43 securely clamped thereto by means of the bolt and nut arrangement 44. Integral with the outer end of the crank arm 43 is a ball 45 which forms part of a ball and socket connection for causing the shaft 16 to drive a pitman or connecting rod 14. The crank end of the pitman is provided with a pitman head 47 for enclosing a pair of bushing blocks 48 and 49 the inner ends of which are spherical to conform to the shape of the ball 45 to thus provide the ball and socket connection. The lower end of the pitman is provided with a similar head 50 provided with similar bearing blocks 51 for cooperating with a ball 52 mounted on a stem 53 which is secured to the sickle blade 20 by means of screws 54. The resilient plate 25 is provided with a slot 55 of the shape shown in Figure 1 so that the plate does not interfere with the proper operation of the sickle blade.

Any suitable clutching and driving mechanism may be used for establishing a driving connection between the motor driven shaft 5 of the mower and the shaft 16 which drives the auxiliary cutter. In the embodiment of the invention shown, the clutch includes an outer cylindrical member 56 which is cast integral with the bevel gear 17 and which is freely mounted on the engine shaft 5. Positioned within the member 56 is a second clutch member 57, the outer portion of which is cylindrical to provide a ring 58 which is split so that it may be expanded into engagement with the clutch member 56. An inwardly extending arm 59 is integral with the ring 58 and carries a hub 60 which is keyed or otherwise secured to the shaft 5. In order to provide means for expanding the split ring 58, the upper ends thereof are provided with enlargements 61 which have semi-cylindrical bearings for loosely receiving semi-cylindrical upper ends 64 of operating arms 65. The lower ends of the arms 65 may be moved in and out radially by a wedging sleeve 66, loosely mounted on the shaft 5, the sleeve being actuated by a yoke 67 pivoted on an arm 68 secured to the housing cap 33. In order to permit manipulation of the clutch from a point adjacent the handle of the mower, a link 69 may be connected to the yoke 67 and to a crank arm 70 secured to the lower end of a sleeve 71 mounted for rotation on the control shaft 10 of the mower. The upper end of the sleeve 71 may be provided with a handle 72 as shown.

From the above description it will be seen that the auxiliary cutter and drive therefor is in the form of an attachment which may be connected to the mower or removed herefrom as desired. To mount the attachment on the mower, the main transmission and differential, together with the left wheel (Figure 1) are removed from the frame and from the shaft 5 of the mower. If the shaft 5 is not provided with a keyway, a new shaft having a keyway is substituted to permit the clutch hub 60 to be secured to the shaft. The control shaft 10 is then disconnected, and the sleeve 71 is placed thereon. The auxiliary clutch and transmission are then mounted on the shaft 5, the brackets 12 secured to the frame and the main transmission, differential and wheel reassembled. When so assembled, the sickle, main cutting reel and the drive wheels may be operated simultaneously or independently by the engine on the mower. When both sickle and reel are operated, the machine cuts two swaths, one above the other and effectively cuts tall grass. The attachment thus materially increases the utility of the mower.

While only one embodiment of the invention has been shown and described herein, it is obvious that many changes may be made without departing from the spirit of the invention or the scope of the annexed claims. For example an eccentric may be mounted directly on the shaft 5 in place of the clutch and gear arrangement and connected to the sickle blade through a system of levers or links to actuate the same. Also, a sprocket chain drive might be used to drive reciprocating means for the sickle blade or to drive a second auxiliary reel for performing the functions of the sickle.

What I claim is:

1. In combination with a lawn mower of the type having a frame, a cutting reel and motor mounted thereon and means including a shaft driven by the motor for operatively connecting the motor to the cutting reel, an auxiliary cutter mounted on the frame and positioned above the cutting plane of said reel and in front thereof, a clutch associated with said shaft and means for operatively connecting an element of the clutch to said auxiliary cutter to drive the same when the clutch is in engaged position.

2. In an attachment for lawn mowers, a pair of spaced brackets, a sickle mounted thereon, said sickle comprising a sickle bar, a sickle blade mounted thereon and having means cooperating with means on the bar for constraining the blade to proper movement with respect to the bar, a substantially channel shaped resilient plate overlapping the sickle blade for exerting a pressure normal to the cutting plane thereof and means for connecting the resilient plate to said brackets and said sickle bar, said means being adjustable to permit regulation of the normal pressure.

3. An attachment for lawn mowers of the type having a motor thereon, a handle and controls adjacent the handle for regulating the operation of the mower, said attachment including a sickle, means for mounting said sickle on the front of the frame of the lawn mower, a pitman connection for operating the sickle, a transmission comprising bevel gears, a shaft and a crank for operating said pitman connection, a clutch for operatively connecting said transmission to the drive shaft of said motor and means adapted to be controlled from a point adjacent the handle of the mower for operating said clutch.

4. The combination with a mower having traction elements, a cutting reel and a motor for driving said elements and reel, of a sickle mounted in advance of the reel and above the cutting plane thereof for operating upon tall grass to reduce the same to a level to permit proper cutting by the reel and means including a clutch for transmitting power from the motor to said sickle.

5. The combination with a mower having traction elments, a cutting reel, a motor and means including clutches for driving said elements and said reel, of an auxiliary cutter mounted in advance of the reel and means including a clutch for operatively connecting the auxiliary cutter to the drive shaft of the motor whereby said traction elements, cutting reel and auxiliary cutter may be operating simultaneously or independently of each other.

6. In combination with a lawn mower of a type having a frame, traction elements for the frame, a cutting reel, a cutting reel shaft supported on the frame and a motor mounted on the frame and having a motor driven shaft connected with the traction elements and the cutting reel for driving the same, a sickle, brackets connected to the frame of the mower and to the sickle for supporting the sickle in advance of the cutting reel and above the cutting plane thereof, a pitmen connection for operating the sickle, a crank shaft having a crank connected to the pitmen connection, gearing for driving said crank shaft from the motor driven shaft and a housing for the crank shaft and gearing supported on the motor driven shaft and on one of said brackets.

7. In combination with a lawn mower of the type having a frame, a cutting reel, a motor mounted thereon and means including a shaft driven by the motor for operatively connecting the motor to the cutting reel, an auxiliary cutter, a bracket arrangement for supporting the auxiliary cutter in advance of the reel and above the cutting plane thereof, means for driving the auxiliary cutter from the motor driven shaft and including a housing supported on the motor driven shaft and on the bracket arrangement, bearings in said housing, an intermediate shaft rotatable in said bearings, gearing in said housing for driving the said intermediate shaft from said motor driven shaft and motion transmission mechanism between said intermediate shaft and said auxiliary cutter.

KNUD F. JACOBSEN.